Jan. 26, 1971          B. T. VIRTUE          3,558,201
UNIT PRELOADED ROLLER BEARING
Filed Sept. 10, 1968
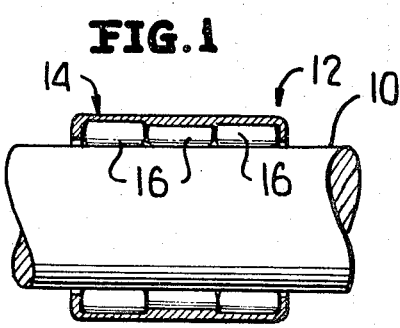
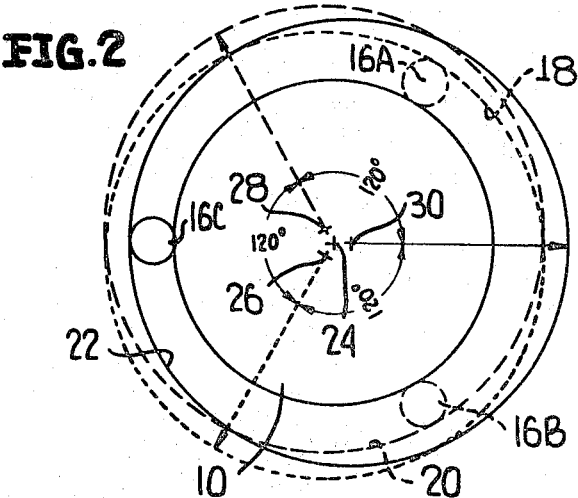
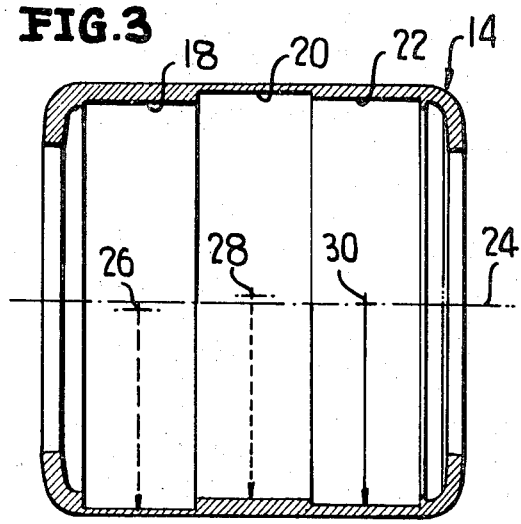
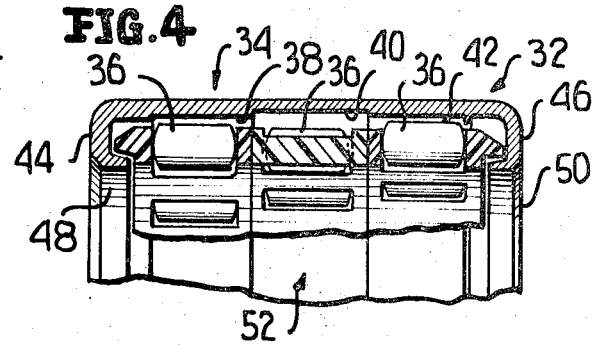
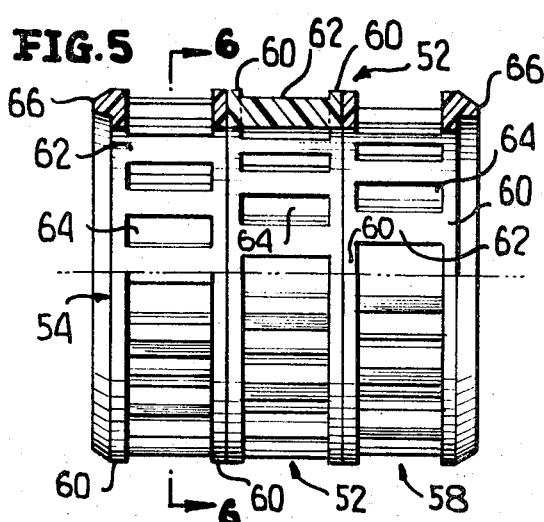
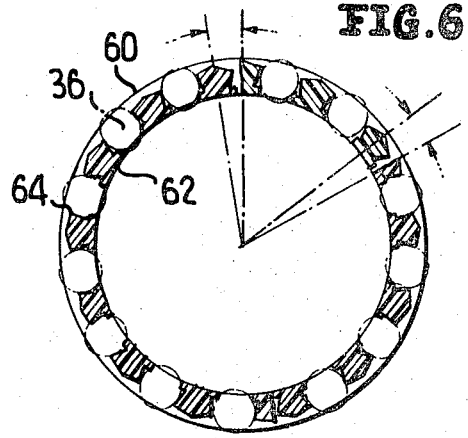
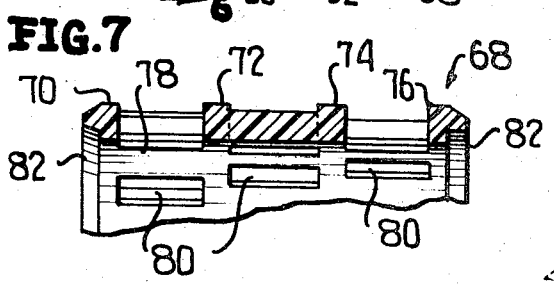
INVENTOR
BYRON T. VIRTUE
BY Mason, Porter, Diller & Brown
ATTORNEYS

United States Patent Office 3,558,201
Patented Jan. 26, 1971

3,558,201
UNIT PRELOADED ROLLER BEARING
Byron T. Virtue, Litchfield, Conn., assignor to The Torrington Company, Torrington, Conn., a corporation of Maine
Filed Sept. 10, 1968, Ser. No. 758,740
Int. Cl. F16c 13/00
U.S. Cl. 308—212                                        8 Claims

ABSTRACT OF THE DISCLOSURE

This disclosure relates to a roller bearing unit which is preloaded whereby there is a minimum of shake of a shaft mounted therein. The bearing includes a plurality of rows of rollers with the rollers being in rolling engagement with inner and outer races. One of the races is provided with a separate raceway for each row of rollers and these raceways have their axes offset from the axis of the bearing whereby although it is not feasible to tightly fit the rollers between the races, each of the raceways has a portion which is disposed closer than normal to the other race so as to provide a preloading effect at this point between the two races. By equally circumferentially spacing these points, a full supporting of a shaft is facilitated.

---

This invention relates in general to new and useful improvements in roller bearings, and more particularly to a preloaded roller bearing.

It is to be understood that inasmuch as the rollers of a roller bearing must travel relative to the fixed race, it is not feasible to make the clearance between the two races equal to the diameter of the roller or only minutely greater. Accordingly, a shaft mounted within a roller bearing has a certain degree of shake in accordance with the clearance provided within the roller bearing.

In the past, attempts have been made to preload roller bearings. However, there has been a constant tendency for the rollers to wedge and as a result, such preloaded bearings have proved to be unsuccessful.

In accordance with this invention, it is proposed to provide a preloaded roller bearing wherein the preloading is spaced circumferentially about the axis of rotation of the bearing whereby there is an adequate supporting of the shaft against undue shake and at the same time, the normal problems encountered in preloaded roller bearings are eliminated.

The primary feature of this invention is the provision of a bearing race which has formed thereon a plurality of separate raceways for engagement by a plurality of rows of rollers, each of the raceways having an axis which is radially offset from the axis of the intended bearing, and the offsetting of the axes of the raceways being equally circumferentially spaced whereby the surface of each raceway progressively moves towards and then away from the axis of the bearing with the result that there is a preloading at one point only along each raceway with the tendency of the preloaded bearing to fail thereby being reduced to a minimum.

Another feature of this invention is to provide a preloaded roller bearing having a plurality of rows of rollers, the bearing including a pair of races, one of the races having a raceway for each row of rollers disposed concentric to the axis of the bearing, and the other of the races having a raceway for each row of rollers which is disposed eccentric to the axis of the bearing, with the clearances between the raceways being such so as to provide a preloading at the points of minimum clearances, and these points being equally circumferentialy spaced so as to provide adequate support.

A further feature of this invention is the provision of a multiple row roller bearing which is preloaded, the roller bearing having one raceway for each row of rollers disposed in eccentric relation to the axis of the bearing so as to provide a momentary preloading of each roller during each rotation thereof about the axis of the roller bearing, and the points of preloading of the rows of rollers being equally circumferentially spaced to provide adequate support, and there further being provided means for circumferentially staggering the rollers of adjacent rows of rollers whereby there is a staggering of the preloading of the various rollers.

With the above and other objects in view that will hereinafter appear, the nature of the invention will be more clearly understood by reference to the following detailed description, the appended claims and the several views illustrated in the accompanying drawing:

In the drawing:

FIG. 1 is a longitudinal sectional view of a shaft and roller bearing assembly formed in accordance with this invention.

FIG. 2 is a schematic end view of the roller bearing of FIG. 1 and shows the relationship of the various raceways of the outer race member and the manner in which preloading is accomplished.

FIG. 3 is a vertical sectional view on an enlarged scale of the outer race unit of the bearing.

FIG. 4 is an enlarged fragmentary longitudinal sectional view taken through a slightly modified form of preloaded roller bearing.

FIG. 5 is an elevational view with parts broken away and shown in section of a three-piece retainer for the roller bearing of FIG. 4 and shows more specifically the details thereof.

FIG. 6 is a transverse sectional view taken along the line 6—6 of FIG. 5 and shows more specifically the construction of the retainer.

FIG. 7 is a fragmentary longitudinal sectional view of another form of retainer.

Referring now to the drawing in detail, it will be seen that there is illustrated in FIG. 1 a shaft and bearing assembly formed in accordance with this invention. The shaft and bearing assembly includes a shaft 10 and a preloaded bearing assembly, generally referred to by the numeral 12. The preloaded bearing assembly 12 includes an outer race unit 14 and a plurality of rows of rollers 16.

Referring now to FIG. 3 in particular, it will be seen that in its preferred embodiment, the race unit 14 is preferably formed of sheet metal, although it may be machined from a length of tubing. It will be seen that the race unit 14 is provided with a plurality of raceways 18, 20 and 22, there being one raceway for each of the rows of rollers 16. It is to be further noted that while each of the raceways 18, 20 and 22 is cylindrical and all of the raceways are of the same diameter, the raceways are radially offset from the axis of the bearing assembly 12, the axis being identified by the numeral 24. With reference to FIG. 2 in particular, it will be seen that the raceways 18, 20 and 22 have axes 26, 28 and 30, respectively, which are equally radially offset from the axis 24 and are equally circumferentially spaced about the axis 24. As a result, when a roller 16A is disposed between the shaft 10 and the raceway 18 in the position illustrated in FIG. 2, there is a preloading of the roller 16A. In like manner, a preloading ocurs on the rollers 16B and 16C. Since the preloaded rollers are disposed in equal circumferentially spaced relation, it will be seen that there is a firm supporting of the shaft 10 at all times.

It is to be understood that during the operation of the bearing assembly 12, the rollers of each row of rollers will be progressively preloaded and then released and therefore, at all times the shaft 10 is adequately supported against shake. On the other hand, since the rollers are preloaded only momentarily, there is no undue wedging of the rollers between the raceways or other interference with the rolling of the rollers along their respective raceways.

At this time it is pointed out that the shaft 10 forms the inner race of the bearing assembly 12 with the surface thereof defining raceways for the three rows of rollers 16. The axis of each of the raceways defined by the shaft 10 is coaxial with the axis 24.

Reference is now made to FIG. 4 in particular wherein there is illustrated a slightly modified form of bearing assembly which is generally referred to by the numeral 32. The bearing assembly 32 is also intended to cooperate with a shaft, such as the shaft 10, although it is also feasible that it may cooperate with a sleeve. The bearing assembly 32 differs from the bearing assembly 12 primarily in that the bearing assembly 12 is a full complement bearing whereas the bearing assembly 2 has the rollers thereof disposed within circumferentially spaced relation. The bearing assembly 32 includes a race unit 34 and a plurality of rows of rollers 36. The race unit 34, like the race unit 14 is preferably formed of sheet metal and has the inner surface thereof contoured to define a plurality of raceways 38, 40 and 42, one raceway for each of the rows of rollers 36.

The raceways 38, 40 and 42 are disposed eccentric to the axis of the bearing assembly 32 with the axes of these raceways being uniformly circumferentially spaced about the axis of the bearing assembly in the manner described above with respect to the bearing assembly 12.

It is to be noted that the race unit 34 has side flanges 44 and 46 which are provided with inturned lips 48 and 50 for cooperation with a retainer for holding the retainer in assembled relation with respect to the race unit 34. The illustrated retainer is generally identified by the numeral 52.

Referring now to FIG. 5 in particular, it will be seen that the retainer 52 is formed of a plurality of similar retainer members 54, 56 and 58. Each of the retainer members is formed of a pair of annular side rims 60 which are interconnected at spaced intervals by cross bars 62. The cross bars 62 cooperate with the side rims 60 to define a plurality of roller receiving pockets 64. It is to be noted from FIG. 6 that the cross bars 62 are of a cross section to receive therebetween a roller 36 which is mounted for freedom of rotation, but at the same time is retained against radially inward displacement out of the associated pocket 64.

Referring once again to FIG. 5 in particular, it will be seen that the retainer members 54 and 58 are of an identical construction, but reversed in their positions. Furthermore, it will be seen that the only difference between the retainer member 56 and the retainer members 54 and 58 is that the retainer members 54 and 58 have on their exposed side rims 60 an annular projecting lip 66 which is engageable with the lips 48, 50 so as to retain the retainer 52 in position within the race unit 34.

It is to be understood that the individual retainer members 54, 56 and 58 may rotate relative to one another and function individually. However, normally the retainer members will rotate as a unit.

Referring now to FIG. 7, it will be seen that there is illustrated another form of retainer which is identified by the numeral 68. The retainer 68 is similar to the retainer 52, but is of a one-piece construction as opposed to being formed of three separate members. The retainer member 68 is preferably of a molded construction and includes four annular rings 70, 72, 74 and 76 which are evenly axially spaced. These rings are interconnected by means of cross bars 78 which are arranged in rows between the respective rings and wherein axially adjacent ones of the cross bars 78 are circumferentially staggered. This staggering of the cross bars 78 presents rows of pockets 80, which are configured similar to the pockets 64, and which pockets 80 are so arranged whereby axially adjacent pockets are circumferentially staggered.

It is to be noted that the rings 70 and 76 have axially extending annular projections 82 on their exposed faces. The projections 82 correspond to the lips 66 and serve to interlock the retainer 68 with the race unit 34.

It is to be understood that the retainer 68 will retain the rollers 36 in staggered relation whereby as the retainer 68 rotates relative to the race member 34, one roller only of the three rollers which are momentarily preloaded will be released from its fully preloaded condition. It will be readily apparent that this will contribute to the stable mounting of the shaft 10 or a similar shaft against shake.

At this time it is pointed out that although the invention has been specifically illustrated and described as being of a construction wherein the outer race unit is provided with the plurality of separate raceways disposed in eccentric relation to the axis of the bearing, it is to be understood that a similar preloading could be provided in a bearing assembly where the outer race has the raceway thereof concentric with the axis of the bearing, and the inner race of the bearing would have a plurality of eccentrically positioned raceways.

Although only preferred embodiments of the invention have been specifically illustrated and described herein, it is to be understood that minor variations may be made in the disclosed bearing assembly without departing from the spirit of the invention.

I claim:
1. In a rolling bearing assembly of the type including a predetermined axis, a race unit particularly adapted to provide a preloading on a predetermined shaft, said race unit comprising a one-piece sleeve having at least three interconnected races for rolling bearing elements formed in the surface thereof in equally circumferentially spaced realtion, each of said races being cylindrical and having an axis disposed parallel to said predetermined axis and radially offset therefrom, said race axes being arranged in fixed circumferentially spaced relation about said predetermined axis, each race being of a diameter sufficiently in excess of the diameter of the intended shaft to receive rolling bearing elements, and each race defining a rolling surface for rolling bearing elements.

2. A preloaded bearing assembly comprising inner and outer race units and rolling bearing elements positioned between said inner and outer race units in rows, said bearing assembly having a predetermined axis of rotation, one of said race units having a raceway for said rolling bearing elements disposed coaxially with said predetermined axis, and the other of said race units having a plurality of raceways in accordance with the number of said rows, each of said other race unit raceways being cylindrical and having an axis disposed parallel to but radially offset from said predetermined axis with the axes of said other race unit raceways being circumferentially spaced about said predetermined axis.

3. The bearing assembly of claim 2 wherein the axes of said other race unit raceways are equally offset from said predetermined axis.

4. The bearing assembly of claim 2 wherein the axes of said other race unit raceways are equally offset from said predetermined axis and equally circumferentially spaced.

5. The bearing assembly of claim 2 together with means retaining rolling bearing elements of each row in circumferentially spaced relation and adjacent rolling bearing elements of adjacent rows being in circumferentially offset relation.

6. The bearing assembly of claim 2 together with means retaining rolling bearing elements of each row in circumferentially spaced relation and adjacent rolling bearing elements of adjacent rows being in circumferentially offset relation, said retaining means being in the form of a single retaining member having a plurality of rows of openings for said rolling bearing elements, adjacent openings of adjacent rows of openings being in circumferentially staggered relation.

7. The bearing assembly of claim 2 together with means retaining rolling bearing elements of each row in circumferentially spaced relation, there being separate retaining means for each row of rolling bearing elements, and said retaining means being similar.

8. The bearing assembly of claim 2 wherein said one race unit is in the form of a shaft, said other race unit being formed of sheet metal, and said rolling bearing elements being in the form of rollers.

References Cited
UNITED STATES PATENTS 3,199,933  8/1965  Rogerson et al. _____ 508—121

FOREIGN PATENTS 1,301,718  7/1962  France _____ 308—121

FRED C. MATTERN, Jr., Primary Examiner

F. SUSKO, Assistant Examiner